Aug. 6, 1968            J. A. FRUETEL            3,395,819
SPARE TIRE HOLDER FOR VEHICLES
Filed Feb. 21, 1966
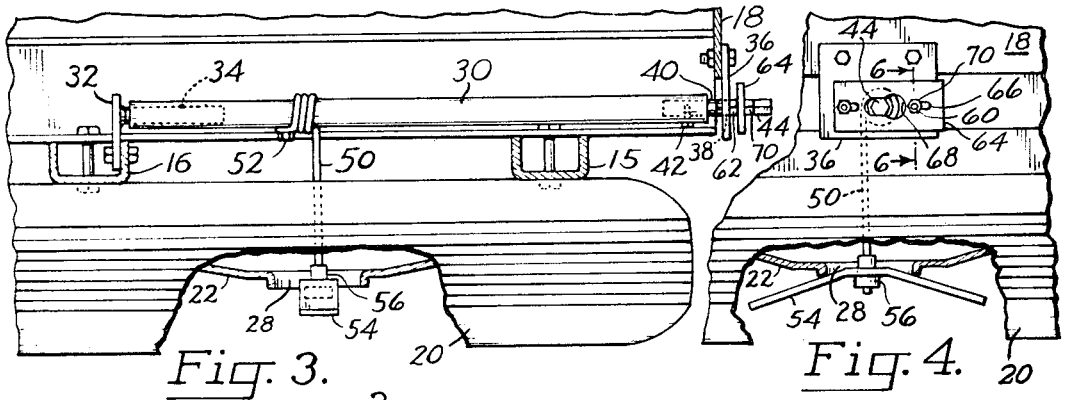
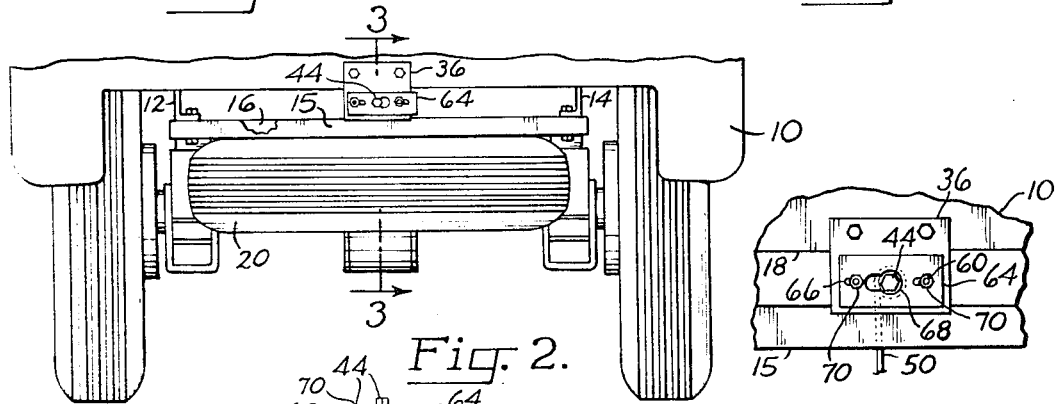
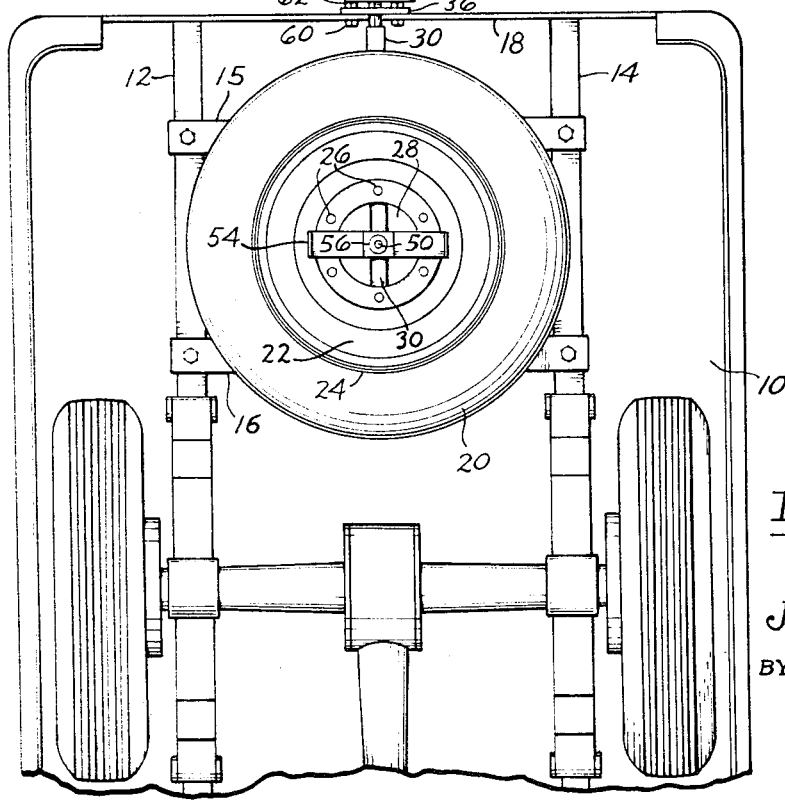
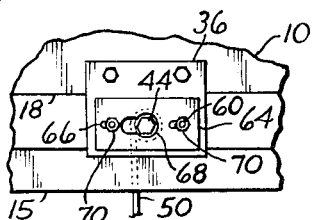
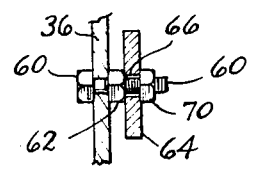
John A. Fruetel
INVENTOR
BY Eugene D. Farley
Atty.

United States Patent Office 3,395,819
Patented Aug. 6, 1968

3,395,819
SPARE TIRE HOLDER FOR VEHICLES
John A. Fruetel, Rte. 3, Box 813,
Albany, Oreg. 97321
Filed Feb. 21, 1966, Ser. No. 529,005
1 Claim. (Cl. 214—451)

ABSTRACT OF THE DISCLOSURE

A winch bar is mounted rotatably above the pair of vehicle body frame members which are spaced apart a distance less than the diameter of a spare tire and which are longer than the diameter of the spare tire wheel. A cable secured at one end to the winch bar hangs freely between the frame members and is provided at its free end with a dished bar which centers itself crosswise under the central opening in the wheel. Upon rotation of the winch bar the wheel and tire assembly is drawn upwardly to a horizontal storage position in which the tire resiliently abuts the lower sides of the body frame members. A lock secures the winch bar releasably against rotation to support the tire in the storage position.

---

This invention relates to spare tire holders of the class employed for mounting spare tires on pickup trucks. The invention is described herein with particular reference to such application although it is to be understood that with suitable modifications it may be adapted to the mounting of spare tires employed on other types of vehicles.

The space tire mountings of present day pickup trucks being inaccessible, difficult to operate, and unreliable, it is the general object of the present invention to provide for such use a spare tire holder which possesses the virtues the prior art tire holders lack, namely, those of being accessible, easy to operate and reliable.

In the drawings:

FIG. 1 is a fragmentary plan view of the underside of a pickup truck showing the location of a spare tire mounted thereunder by the holder of the present invention.

FIG. 2 is a view in elevation of the rear end of a pickup truck, also showing the manner of mounting the spare tire thereunder.

FIG. 3 is a sectional view taken along line 3—3 of FIG. 2 and illustrating a winch assembly used in elevating and storing the tire beneath the truck.

FIGS. 4 and 5 are fragmentary detail views in elevation of locking means for locking the spare tire in its supported position; and FIG. 6 is a detail sectional view further illustrating the construction of the locking mechanism.

In its broadest aspect, the spare tire holder of my invention comprises a winch bar, aligned mounting means for mounting the winch bar rotatably on the under side of the truck, cable means having one end secured to the winch bar and the other end wrapped around the bar and running free, and securing means on the free end of the cable for attachment to the spare tire, centrally thereof.

A crank or other winch-operating means operates the winch bar until the tire has been elevated to a horizontal storage position pressed against the underside of the vehicle. Preferably the cable is resiliently stretchable so that by taking up additionally on the winch bar, the cable is stretched. Thereupon it acts as a stout spring, holding the tire tightly in place. Releasable lock means then are applied to restrain the winch bar from rotation in the reverse direction. This locks the tire in place until it is needed.

Considering the foregoing in greater detail and with particular reference to the drawings:

As shown in FIG. 1, the spare tire holder of my invention is designed for application particularly on the underside of the rear end of a pickup truck body, indiiated generally at 10. As is usual, the body includes various frame members including a pair of spaced, longitudinal members 12, 14 and spaced forward and rearward transverse frame members 15, 16, respectively. A vertical rear plate 18 is also a body component.

Spare tire 20 is mounted on a wheel 22 provided in the usual manner with a rim 24, bolt holes 26 and a restricted central opening 28. It is the design of the invention to lift the tire in a horizontal position and to store it in such position in the vacant space beneath transverse frame members 16, 18, to the rear of the truck wheels, as is particularly apparent in FIG. 1.

To this end a winch bar 30 is mounted longitudinally of the truck, about the longitudinal center line thereof. If desired the winch bar may comprise a length of stout black iron pipe open at both ends.

Aligned first and second mounting means are provided for rotatably mounting the winch bar in the indicated location, with its rearward end projecting outwardly so as to be easily accessible to a person standing behind the truck. Both mounting means may be attached to any conveniently located frame or body member of the truck.

In the illustrated form of the invention, the first or forward mounting means is connected centrally to transverse frame member 16. It comprises a plate 32 bolted vertically to frame member 16 and mounting a short shaft 34. The latter is dimensioned for reception in the open end of hollow winch bar 30, thereby journaling the inner end of the winch bar on the shaft.

The second or rearward mounting means also may be secured to a transverse member, for example transverse member 15. Preferably, however, it is fastened to rear body plate 18, as shown particularly in FIG. 3.

A support plate 36 is bolted to plate 18. Plate 36 has a central bearing opening 38 which rotatably receives a stub shaft 40. The latter shaft has a diameter such that it is slidably received in the open rearward end of hollow winch bar 30 where it is secured by means of set screws 42. The outer end of stub shaft 40 extends well beyond the plane of plate 36 and is formed with an integral nut 44.

Nut 44 serves two functions. First, it affords a means of driving the winch bar, by connecting a crank which may comprise the lug wrench of the vehicle. Second, it affords a means of locking the winch bar against rotation, as will appear hereinafter.

The forward and rearward mountings of winch bar 30 are axially aligned, with the result that the bar can turn freely. It supports the tire by means of a cable 50. Cable 50 is resiliently stretchable and of strong construction. It may comprise, for example, a product such as airplane control cable. The standing end of cable 50 is secured to the bar by means of bolt 52. The running end of the cable mounts the securing means by means of which the cable is secured releasably to the tire.

The tire securing means comprises a bar 54 angularly bent to an inverted dished configuration. The central portion of bar 54 is perforated and receives a shoulder ferrule 56 which is pressed securely onto the end of the cable by known methods.

To attach the tire to the running end of the cable, bar 54 is inserted endwise through the central opening 28 of the tire wheel. It is then arranged crosswise. Upon taking up on the cable, the bar engages the central portion of the wheel and, because of its configuration, centers itself properly so that the tire may be elevated in a balanced position.

When the tire is fully elevated to its storage position of FIGS. 2 and 3, snugly seated against the underside of the body, for example, against the undersides of transverse frame members 15, 16, continued pressure may be applied to the crank operating the winch bar, with the result that resilient cable 50 is stretched slightly. It thus acts as a spring holding the tire immovably against the underside of the truck body.

The tire may be maintained in this storage position by locking the winch bar against reverse rotation. The locking means employed are shown in FIGS. 4, 5 and 6.

Vertical plate 36 which journals stub shaft 40 mounts a pair of laterally spaced, rearwardly projecting bolts 60. Spacing nuts 62 are threaded onto the bolts. A locking plate 64 is mounted on the bolts behind spacing nuts 62.

Locking plate 64 is provided with a pair of horizontal adjustment slots 66 which accommodate the bolts. In addition, it is provided with a central keyhole slot 68.

The enlarged portion of the keyhole slot has a diameter sufficiently large so that nut 44 can rotate freely in it. However, the diameter of the restricted portion of keyhole slot 68 is substantially the same as the diameter of nut 44.

Locking plate 64 thus is slidable laterally between an unlocked position in which nut 44 registers with and enters the enlarged portion of the keyhole slot and a locking position in which nut 44 registers with and enters the restricted portion of the keyhole slot. In the latter position winch bar 30 is prevented from rotating. It may be maintained in this condition by tightening down on nuts 70 threaded onto the outer ends of bolt 60.

OPERATION

The operation of the spare tire holder of my invention is as follows:

When it is desired to mount tire 20 in the holder, the tire is placed horizontally on the ground beneath winch bar 30. The winch bar then is reversely rotated to unwind resilient cable 50 sufficiently so that bar 54 may be inserted endwise through central opening 28 of the wheel upon which the tire is mounted.

Bar 54 then is turned crosswise, a lug wrench or other crank applied to nut 44 on the rearward accessible end of tire holder 30, and the winch bar rotated in the forward direction. This lifts the tire horizontally until it is pressed snugly against the underside of the vehicle, for example against the underside of transverse frame members 16, 18.

As explained above, continued rotation of the winch bar stretches cable 50 until it exerts a spring-like action, immobilizing the tire.

Lock plate 64 then is moved sideways from its FIG. 5 unlocked position to its FIG. 4 locked position. Nuts 70 then may be tightened down on bolts 60 to secure it in its locked position.

The tire thus is maintained out of the way during use of the vehicle. However, it is easily accessible when needed, being released simply by reversal of the sequence outlined above.

It accordingly will be seen that there is provided an apparatus in which the several objects of this invention are achieved and which is well adapted for the conditions of practical use.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A spare tire holder for a vehicle having a body provided with a pair of substantially parallel frame members extending downward from the underside thereof and spaced apart a distance less than the diameter of a spare tire, the frame members being longer than the diameter of the spare tire wheel, the holder comprising
   (a) a winch bar,
   (b) mounting means for mounting the winch bar rotatably on the body above the lower sides of said frame members with the outer end of the winch bar terminating adjacent the outer side of the vehicle, said outer end of the winch bar being provided with a nut dimensioned to receive a crank for turning the winch bar,
   (c) the mounting means including an inner bearing rotatably supporting the inner end of the winch bar,
   (d) connecting means for connecting the inner bearing to the inner one of said frame members in a position of axial alignment with the winch bar,
   (e) the mounting means also including a mounting plate adapted to be secured to the outer side of the vehicle and having therethrough a central bearing opening dimensioned to receive the outer end of the winch bar, journaling the same therein,
   (f) cable means wound about the winch bar with one end fastened thereto and the other hanging downward freely between said frame members,
   (g) securing means on the free end of the cable means for securing a spare tire wheel thereto,
   (h) the winch bar being operable upon rotation to draw the spare tire and wheel assembly upward to a horizontal storage position in which the tire resiliently abuts the lower sides of said spaced frame members,
   (i) and releasable lock means on the outer side of the vehicle body engageable with the nut and operable to lock the winch bar against rotation, thereby supporting the tire in its storage position, the lock means comprising a plate having a central keyhole-shaped opening therethrough, the diameter of the large portion of the opening being greater than the diameter of the nut and the diameter of the small portion of the opening being substantially equal to the diameter of the nut,
   (j) the locking plate being provided with a pair of spaced locking slots, one on each side of the keyhole opening, and the mounting plate being provided with a pair of spaced bolts with nuts, dimensioned one to enter each of the locking slots, the bolt nuts being adapted to clamp the locking plate to the mounting plate releasably locking the same in position, the locking plate thereby being mounted for sliding movement between an unlocked position wherein the crank nut enters the large portion of the keyhole opening and can turn freely and a locked position wherein the crank nut enters the restricted portion of the keyhole opening and is locked against rotation.

References Cited

UNITED STATES PATENTS

| | | | |
|---|---|---|---|
| 2,956,716 | 10/1960 | Goulet | 224—42.23 X |
| 325,829 | 9/1885 | Fisher | 151—63 |
| 2,775,358 | 12/1956 | Renouf | 214—451 |
| 3,223,263 | 12/1965 | Fielding | 214—454 |

FOREIGN PATENTS 281,785    1/1931    Italy.

HUGO O. SCHULZ, *Primary Examiner.*